United States Patent [19]
Leach

[11] 3,727,983

[45] Apr. 17, 1973

[54] WHEEL WITH RESILIENT HUB

[75] Inventor: Raymond B. Leach, Omaha, Nebr.

[73] Assignee: Miracle Hub and Wheel, Inc., Omaha, Nebr.

[22] Filed: Sept. 23, 1970

[21] Appl. No.: 74,719

[52] U.S. Cl. ............................................. 301/136
[51] Int. Cl. ................................................. B60b 9/06
[58] Field of Search ............................ 301/133, 136; 308/182

[56] References Cited

UNITED STATES PATENTS

| | | | |
|---|---|---|---|
| 1,193,639 | 8/1916 | Walk | 301/136 |
| 1,214,743 | 2/1917 | Arnold | 301/136 |
| 1,094,259 | 4/1914 | Scognamillo | 301/136 X |
| 812,143 | 2/1906 | Leffort | 301/136 |
| 1,111,473 | 9/1914 | Lahan | 301/136 |
| 1,394,882 | 10/1921 | Beaumont | 301/136 |

FOREIGN PATENTS OR APPLICATIONS

| 373,789 | 3/1907 | France | 301/136 |
|---|---|---|---|

Primary Examiner—Richard J. Johnson
Attorney—Clarence A. O'Brien and Harvey B. Jacobson

[57] ABSTRACT

A wheel with a resilient hub in the form of a rotatable annular member journaled on a non-rotatable hub supported from an axle by a resiliently-biased slide member movably guided on the hub by the use of a bearing assembly. The hub includes apertures provided with plugs to provide communication to bearing races formed in the matching surfaces of the hub and annular member to facilitate assembly with the components being constructed of various materials and of various sizes for various uses.

8 Claims, 7 Drawing Figures

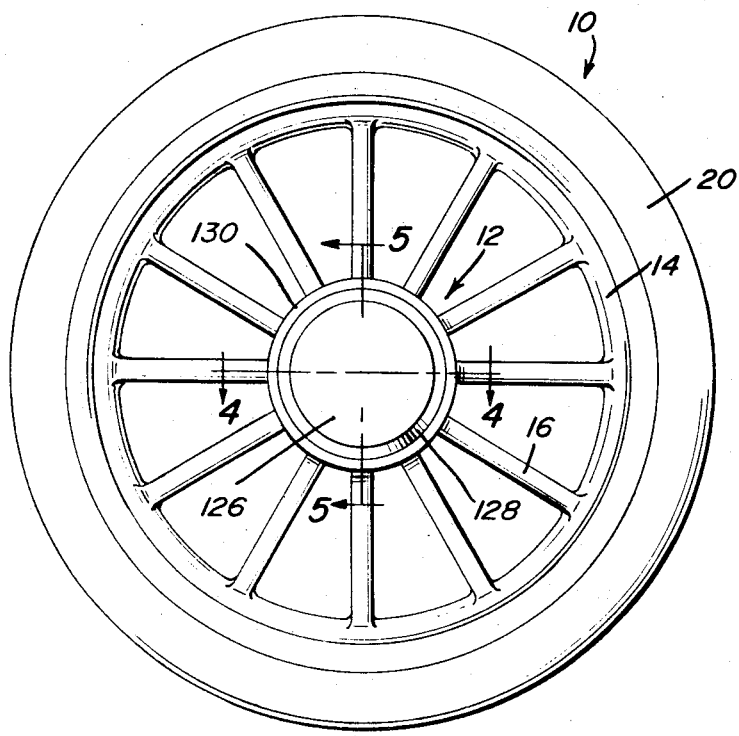
Fig. 1
Fig. 2
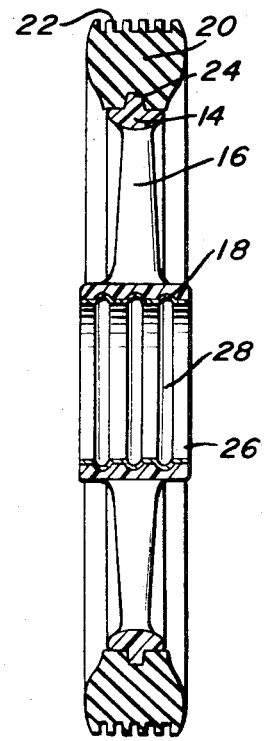
Fig. 3
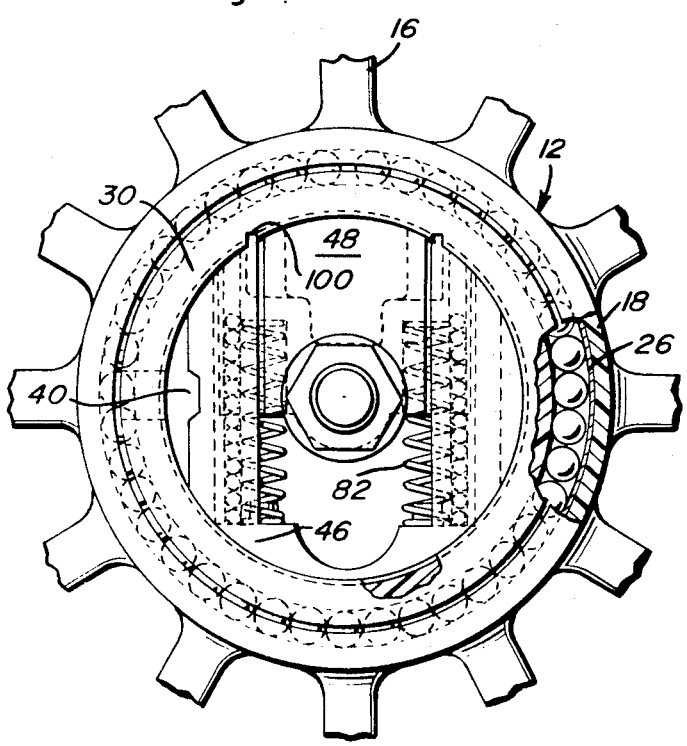
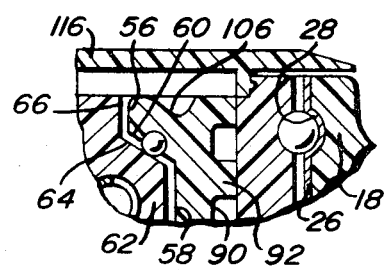
Fig. 7
Raymond B. Leach
INVENTOR.

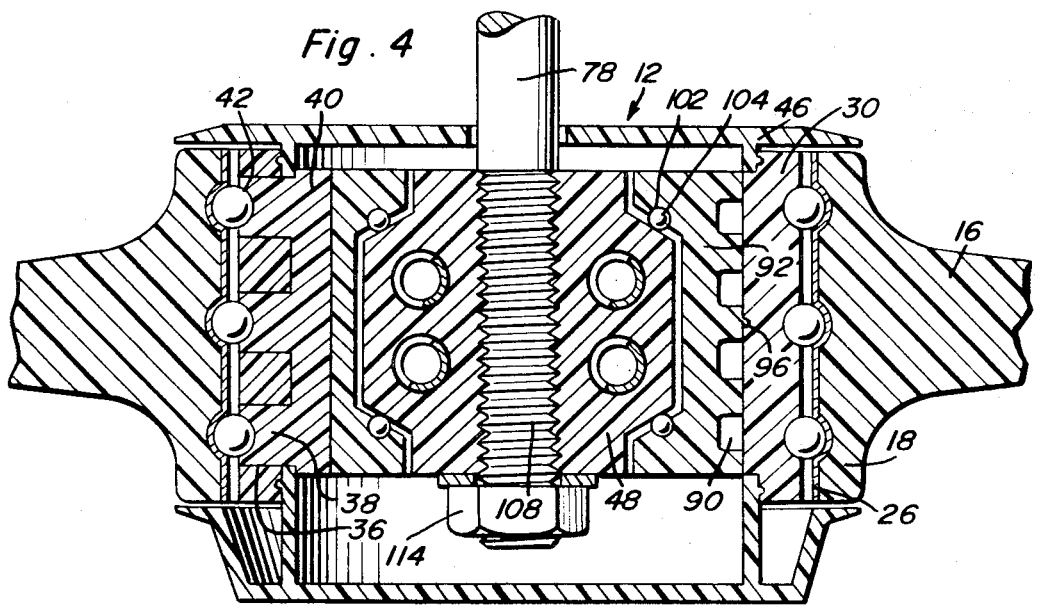
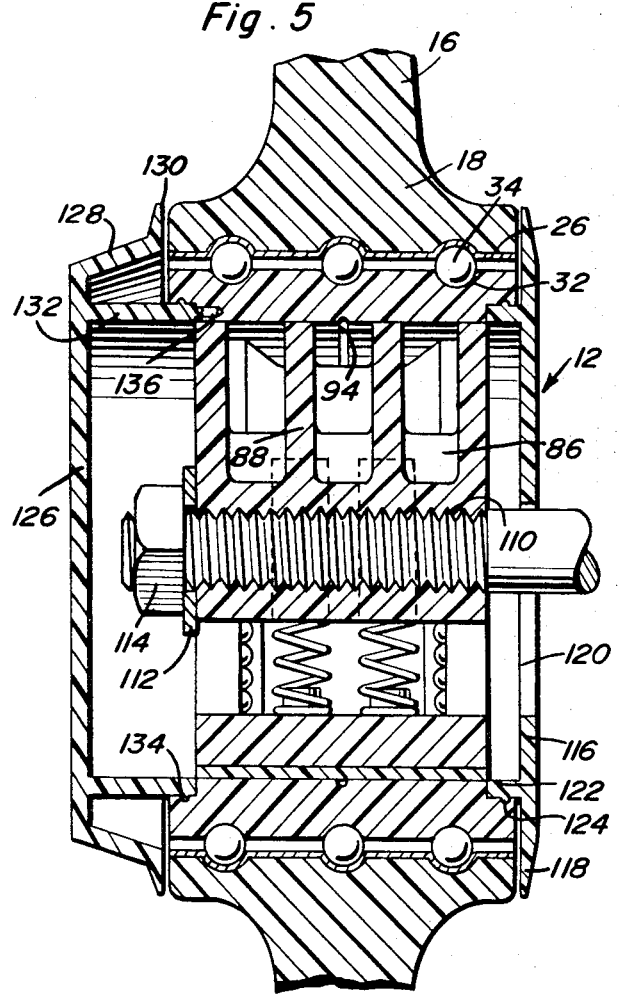
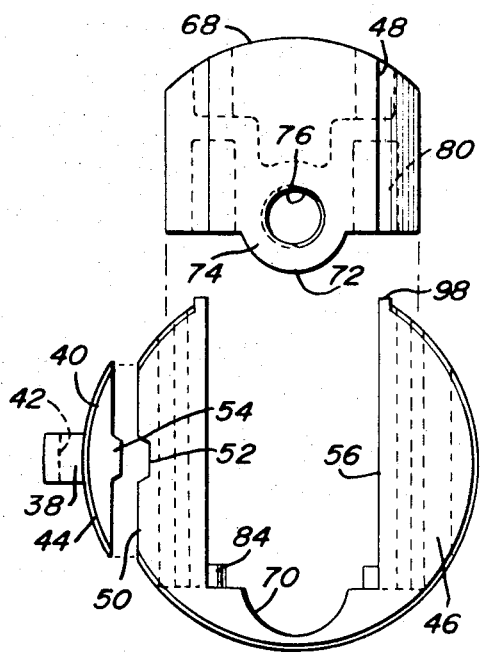
Raymond B. Leach
INVENTOR.

WHEEL WITH RESILIENT HUB

CROSS REFERENCE TO RELATED APPLICATION

This invention incorporates improvements over the structure disclosed in my copending application Ser. No. 882,190, filed Dec. 4, 1969, now Pat. No. 3,664,710, for Resilient Hub which is incorporated herein by reference.

BACKGROUND OF THE INVENTION

1. FIELD OF THE INVENTION

The present invention generally relates to a wheel with a resilient hub structure incorporated therein employing a multiple race ball bearing assembly journaling the wheel on a non-rotatable hub with the hub having apertures associated with each bearing race to enable access thereto for insertion of ball bearings into the races. The non-rotatable hub includes a resiliently-biased slide member connected with the axle for relative movement in relation thereto.

2. DESCRIPTION OF THE PRIOR ART

Various attempts have been made to resiliently support a hub within an annular wheel and other attempts have been made to resiliently support a vehicle frame or body from the wheeled structure. While such devices have been successful to a degree, previously known devices are relatively expensive and somewhat complicated which does not provide a structure effective for the purpose of enabling incorporation thereof into many types of vehicles or use in various orientations.

SUMMARY OF THE INVENTION

The present invention generally relates to a wheel with a resilient hub incorporated therein in which the wheel is journaled on a non-rotatable hub and the hub is provided with a spring-biased sliding assembly mounted on a non-rotatable axle to rotatably support the wheel from the axle and permit resilient movement of the axle in relation to the annular wheel.

Another object of the invention is to provide a wheel and resilient hub in which the annular wheel member is journaled on the hub by a multiple race ball bearing assembly with the hub including apertures enabling access to the bearing races for insertion of ball bearings to fill the bearing races after which the apertures are closed with appropriately shaped plugs.

A further object of the invention is to provide a wheel and resilient hub in accordance with the preceding object in which the hub includes a sliding assembly which is guided in its vertical movement by a guide bearing assembly with spring members biasing the same to a predetermined position.

DESCRIPTION OF THE DRAWINGS

FIG. 1 is a side elevational view of a wheel and resilient hub of the present invention.

FIG. 2 is an enlarged elevational view, with portions broken away, of the hub structure with the cover removed.

FIG. 3 is a vertical sectional view of the wheel illustrating the cylindrical annular member and the bearing races therein.

FIG. 4 is a transverse, plan sectional view, on an enlarged scale, taken substantially upon a plane passing along section line 4—4 of FIG. 1 illustrating structural details of the resilient hub.

FIG. 5 is a vertical sectional view, on an enlarged scale, taken substantially upon a plane passing along section line 5—5 of FIG. 1 illustrating further structural details of the resilient hub.

FIG. 6 is an exploded side elevational view of three of the components of the hub.

FIG. 7 is a detailed sectional view illustrating in more detail the hub structure and the guide bearing for the slide assembly.

DESCRIPTION OF THE PREFERRED EMBODIMENT

Referring now specifically to the drawings, the wheel is generally designated by the numeral 10 and the resilient hub assembly is generally designated by the numeral 12 which may be employed in various uses and constructed of various materials with the wheel including an annular outer member 14 supported by a plurality of radial spokes 16 rigid with and extending radially outwardly from an inner annular member 18. The outer annular member 14 is in the form of a wheel rim and supports a tire 20 such as a solid tire having a peripheral tread 22 on the outer circumference thereof. The annular member 14 or rim is provided with a peripheral projection 24 centrally disposed therein which is received in a corresponding groove or recess in the tire 20. The tire 20 may be molded on the rim 14 and permanently secured thereto or otherwise mounted or connected thereto for rotation therewith. As illustrated, the annular member 18, spokes 16 and wheel rim 14 are of one piece unitary construction and may be conveniently constructed of plastic material or other material as desired.

Lining the interior of the annular member 18 is a metal sleeve 26 having a plurality of annular recesses 28 extending peripherally thereof and defining bearing races. The annular member 18 intimately engages the outer surface of the sleeve 26 and is correspondingly shaped. The metal bearing sleeve 26 with the bearing races formed therein may be inserted on the mold core when the wheel is being formed so that the metal bearing race sleeve 26, in effect, becomes unitary with the annular member 18 for rotation therewith.

Mounted interiorly of and rotatably in relation to the annular member 18 is a substantially cylindrical hub member 30 which has an external peripheral surface of substantially the same dimensions as the internal surface of the bearing sleeve 26 but with the periphery of the hub 30 concentrically spaced inwardly therefrom. The external surface of the hub 30 is provided with peripheral recesses or grooves 32 in alignment with the bearing races 28 and being correspondingly shaped, that is, generally U-shaped in cross-sectional configuration, for receiving a plurality of ball bearings 34 disposed in each of the matching races 28 and 32 which not only rotatably journals the wheel from the hub 30 but also prevents relative axial movement of the wheel on the hub. The hub 30 at one point in the periphery thereof is provided with three apertures or holes 36 which extend from the inner surface thereof into communication with the peripheral recesses or bearing races 32 as illustrated in FIG. 4. These holes 36 permit the ball bearings 34 to be assembled into the bearing races and removed therefrom when desired thus enabling the hub 30 to be inserted into the annular member 18 of the wheel and ball bearings inserted through the holes 36 when the races 32 in the hub 30 are aligned with the races 28 in the metal sleeve 26 thus retaining the hub 30 assembled within the annular member 18 of the wheel.

Closure plugs 38 are provided for each of the holes and the plugs 38 are rigidly affixed to a transversely extending connecting member or base 40 so that all of the plugs 38 may be inserted into the holes 36 at one time. The free end of each plug 38 is provided with a groove or recess 42 corresponding in transverse configuration to the bearing races 32 and also being curved arcuately in the same manner as the races 32 so that the recesses 42 form a continuation of the bearing races 32. Thus, the base 40 not only serves to retain the plugs 38 in proper relation to the holes and to each other but also assures that the recesses 42 will be properly oriented to form continuations of the bearing races 32. As illustrated in FIG. 6, the surface of the base which faces the interior of the cylindrical hub 30 is arcuately curved as at 44 to conform therewith.

Mounted within the cylindrical hub 30 is sliding block guide 46 which has an overall cylindrical outline when combined with a sliding block 48 and the base member 40 for the plugs 38 as illustrated in FIG. 6. A portion of the peripheral surface of the block guide 46 is removed to provide a flattened surface 50 which engages the base member 40 with the arcuate surface 44 of the base member 40 forming a continuation of the peripheral surface of the sliding block guide 46 when assembled therewith. To properly locate the base 40 in relation to the flattened surface 50, the flattened surface 50 is provided with a transverse recess 52 which receives a correspondingly shaped rib 54 for reception in the recess 52 thus securely positioning the base 40 on the periphery of the sliding block guide 46. The central portion of the block guide 46 is provided with an enlarged vertical notch 56 which communicates with the upper periphery of the block guide with the wall surfaces which define the notch 56 including vertical centrally disposed recesses 58 which are relatively wide and which are defined by inwardly inclined retaining surfaces 60 which slidably and guidingly receive the sliding block 48 which has side surfaces with a central projection 62 corresponding in shape and configuration to the recess 58 and inclined surfaces 64 corresponding with the inclined surface 60 and edge wall surfaces 66 which correspond with the walls of the notch 56 as best illustrated in FIG. 7 so that the sliding block 48 will be guided during its vertical sliding movement in the notch 56. The upper surface of the sliding block 48 is arcuately curved at 68 and forms a continuation of the periphery of the sliding block guide when in alignment therewith. The bottom surface of the notch in the sliding block guide 46 is provided with a U-shaped recess 70 which is shaped to generally conform with the arcuate bottom surface 72 of a projection 74 on the slide block which has a bore 76 extending therethrough for receiving an axle 78 attached to a vehicle or other structure.

Each side of the sliding block is provided with a pair of blind bores or sockets 80 extending upwardly from the lower surface thereof for receiving and guiding the upper ends of coil compression springs 82 which have their lower ends received on and retained by upwardly extending projections or studs 84 integral with the bottom surface of the sliding block guide thus spring-biasing the sliding block upwardly in the notch 56 in the sliding block guide as illustrated in FIGS. 2 and 5 with the axle 78 being oriented in the center of the hub structure 12 when the arcuate surface 68 thereof is in engagement with the interior of the cylindrical hub 30. The upper portion of the sliding block is provided with hollow areas 86 defined by webs 88 which provide rigidity to the sliding block while reducing the weight thereof. Also, the exterior of portions of the hub 30 are provided with recesses 90 defined by webs 92. Also, the interior of the cylindrical hub 30 is provided with a peripheral centrally disposed groove 94 which receives a corresponding peripheral projection 96 on the sliding block guide so that the sliding block guide will snap into the hub 30 in aligned relation thereto.

Also, the sliding block guide is provided with a pair of upwardly extending projections 98 defining the opposed upper edges of the notch 56 and these projections 98 are received in correspondingly positioned notches 100 in the cylindrical hub 30. This construction illustrated in FIGS. 2 and 6 precludes relative rotation between the sliding block guide 46 and the cylindrical hub 30.

As illustrated in FIG. 4, the inclined surface 60 defining the notch in the sliding block guide 46 is provided with an arcuate recess or race 102 receiving a plurality of ball bearings 104 therein. The race 102 extends around slightly more than one half of the peripheral extent of the ball bearings 104 thus retaining them assembled in the recess 102 and the free portions of the periphery of the ball bearings 104 are in bearing engagement with the correspondingly inclined surfaces 64 on the sliding block 48 thus providing a ball bearing relationship between the sliding block 48 and the sliding block guide 46 with the ball bearings 104 being snapped into the recess 102 or otherwise retained in position by a suitable retaining device. When the components of the hub are constructed of plastic material, the resiliency of the plastic is sufficient to enable the ball bearings 104 to be snapped into position and will be retained in position due to the resiliency of the plastic material. The structure illustrated in FIG. 7 is the same as that illustrated in FIG. 4 except that the side portions of the sliding block are different shaped by virtue of being provided with a peripheral recess or groove 106 therein. Otherwise, the bearing structure and related surfaces are the same.

To assure that the axle 78 is stationarily secured with respect to the sliding block 48, the axle 78 is externally threaded at 108 and the bore 76 is internally threaded at 110 so that the axle 78 is threaded into and through the bore 76 in the sliding block 48. A washer 112 and retaining nut 114 are threaded onto the outer end of the axle 78 for locking the axle and sliding block non-rotatively together. For concealing the interior of the hub structure, an inner hub cap 116 is provided which has a diameter generally equal to the diameter of the annular member 18 on the wheel and the outer periphery of the plate-like hub cap 116 may taper slightly as at 118. Also, the inner hub cap 116 is provided with a vertical slot 120 therein which extends from the center thereof downwardly to enable downward movement of the sliding block 48 when the springs 82 are compressed. For detachably mounting the inner hub cap 116, it is provided with an inwardly extending flange 122 thereon which fits telescopically into an annular recess provided therefor in each side of the cylindrical hub 30 with the flange and recess having a correspondingly shaped peripheral snap ring and groove or detent and groove 124 for releasably securing the inner hub cap in position on the hub 30. An outer circular hub cap 126 is provided to enclose the retaining nut 114 and close the outer portion of the hub structure. The hub cap 126 includes an inwardly extending and inclined peripheral flange 128 terminating in an outwardly extending tapered flange 130 generally conforming in shape and configuration to the annular member 18 of the wheel. To mount the outer hub cap 126 in position, an inwardly extending cylindrical flange 132 is provided which telescopes into a correspondingly shaped recess in the cylindrical hub 30 with a snap ring and groove 134 being correspondingly formed on the flange and in the recess for snap-retention of the hub cap. One portion of the flange 132 is provided with a projecting pin 136 received in a corresponding socket in the cylindrical hub which serves to locate the hub cap 126 so that any indicia placed on the external surface of the external hub cap 126 will be retained in an upright readable position since the pin 136 will always orient the hub cap in proper relation to the indicia thereon.

The components of the hub may be constructed of plastic material except for the bearing sleeves, bearings, springs, the axle and retaining nut and washer which renders the wheel assembly relatively inexpensive and light in weight but yet enables it to be employed in many uses such as on carts or the like and will effectively absorb shock and cushion loads carried by the axle. While the device has been specifically disclosed as being constructed of plastic and being for cart wheels and the like, it is pointed out that the device may be constructed of other various materials and used wherever desired for supporting a wheel or other rotatable member from a non-rotatable axle or shaft with resiliently-biased movement in one direction being permitted and guided by the structure disclosed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A hub assembly comprising a non-rotative hub member adapted to rotatably support an annular member, said hub member including a slide block guide disposed transversely across the hub member, a slide block movably mounted on the slide block guide, means on said slide block for connection with shaft means, resilient means interconnecting the slide block and slide block guide for biasing the slide block in one direction, said slide block and slide block guide having opposed inclined surfaces, and bearing members interposed between the inclined surfaces to facilitate relative movement therebetween, said slide block guide being substantially U-shaped in configuration with the legs thereof extending upwardly and guidingly receiving the slide block, the facing surfaces of the legs having said inclined surfaces thereon which diverge toward the slide block, said slide block having outwardly converging side surfaces, said bearing members being mounted on the inclined surfaces on said legs.

2. The structure as defined in claim 1 wherein said hub member, slide block guide and slide block are constructed of plastic material, said bearing members mounted on the inclined surfaces of the legs of the slide block guide being in the form of a plurality of spherical balls.

3. The structure as defined in claim 1 wherein said hub member has an external cylindrical surface with a bearing race therein and a hollow interior, said slide block guide being removably mounted in the hollow interior of the hub member, said hub member having a hole extending from the hollow interior to the bearing race to enable insertion of bearing members, and a closure plug for said hole, said slide block guide retaining the closure plug in the hole when disposed within the hollow interior of the hub member.

4. The structure as defined in claim 3 wherein the slide block guide includes projecting means on the surface thereof for interlocking engagement with the hollow interior of the hub member to prevent rotation of the slide block guide in relation to the hub member, the exterior surface of the slide block guide substantially conforming with the hollow interior of the hub member, said closure plug including a base portion disposed between the inner periphery of the hollow interior of the hub member and the slide block guide, the outer end of the closure plug being configured to conform with a portion of the bearing race.

5. A resilient hub for mounting on an axle and for supporting an annular member for rotation and relative transverse movement in relation to the axle comprising a hub member including an inner annular bearing member and an outer annular bearing member rotatably supported on the inner annular bearing member, said inner annular bearing member having a hollow interior, a slide block guide disposed in the hollow interior and including transversely extending guide surfaces, a slide block movably mounted on the slide block guide, means on the slide block for connection with the axle, resilient means interposed between the slide block guide and the slide block for biasing the slide block in one transverse direction in relation to the slide block guide, said slide block and slide block guide having corresponding, opposed inclined surfaces defining the path of movement of the slide block, rotatable bearing members interposed between the inclined surfaces to facilitate relative movement between the slide block and slide block guide, said slide block guide being removably disposed within the hollow interior of the inner annular bearing member, said inner annular bearing member having a bearing race on the external surface thereof and a hole extending from the hollow interior to the bearing race, a plurality of bearing members disposed in the bearing race and engageable with the outer annular bearing member to facilitate relative rotation between the inner and outer annular bearing members, said hole enabling insertion of bearing members into the bearing race, closure means for said hole, said slide block retaining the closure means in the hole when the slide block guide is disposed within the hollow interior of the inner annular bearing member.

6. The structure as defined in claim 7 wherein said resilient means includes separate resilient means interposed between the slide block and slide block guide on opposite sides of the axle to retain the slide block in a balanced condition within the slide block guide to reduce binding thereof.

7. The structure as defined in claim 5 wherein said slide block guide and the inner annular bearing member include interengaging means to prevent rotation of the slide block guide in relation to the inner annular bearing member when inserted into the hollow interior thereof.

8. The structure as defined in claim 7 wherein said outer annular bearing member is provided with a bearing race therein, said outer annular bearing member being constructed of a plastic material having a metal liner therein in which the bearing race is formed for receiving the bearing members.

* * * * *